INVENTORS
DONALD S. CUSHING
& RUSSELL M. SASNETT

THEIR ATTORNEY

United States Patent Office 2,987,066
Patented June 6, 1961

2,987,066
ELECTRIC CONTROL ARRANGEMENT FOR APPLIANCES
Donald S. Cushing and Russell M. Sasnett, Louisville, Ky., assignors to General Electric Company, a corporation of New York
Filed Feb. 23, 1960, Ser. No. 10,403
5 Claims. (Cl. 134—57)

This invention relates to an electric control arrangement, and more particularly to a control arrangement wherein a reversible induction-type motor controls the energization of an electric mechanism by causing energization thereof for one direction of motor rotation and preventing it for the other direction of rotation.

There are many instances in the relatively complex machines run by induction-type electric motors wherein a function of the machine is to be desired if the motor is operating in one direction and where, when the motor is operating in the other direction or is not operating at all, the additional function is not required. This occurs, for instance, in dishwashers of the type which have an induction motor which, in one direction of rotation, causes a washing action and in the other direction of rotation causes a pumping out or draining of the dishwasher. It may be desirable to have water flow in throughout the washing operation, but by the same token it is generally also desirable that water not enter the machine either when the motor is deenergized or when it is operating in the direction to cause the water in the machine to be pumped out. Heretofore, the control of the additional mechanism such as, for instance, the water control valve in the dishwasher has been effected by a separate switch controlled by the sequence control timer, the timer providing control of all of the elements of the machine through appropriate switching arrangements. Manifestly, the cost of the control mechanism is to some extent dependent upon the number of switches which have to be included and operated.

It is an object of our invention to eliminate one timer switch presently required in machines such as dishwashers by subjecting to the control of the motor the electrically actuated mechanism which is to operate for one direction of motor rotation.

More specifically, it is an object of our invention to cause, in one direction of motor rotation, the start winding means of the motor to energize the electric mechanism as a result of the voltage induced in the start winding means and to prevent such energization of the mechanism for the other direction of rotation.

Briefly stated, in accordance with one aspect of our invention, we provide, in combination, an induction-type motor of the type conventionally having relatively rotatable primary and secondary members, and a high-impedance electrically actuated control device to be controlled so that it will operate when the motor rotates in one direction but not when the motor rotates in the other direction. The primary member of the motor may conventionally include a magnetic core, low impedance run winding means, and low impedance start winding means. In the reversible type of motor desired, the start winding means is energizable in two different relationships to the run winding means, providing one direction of relative rotation when one of the relationships is provided and the opposite direction of rotation when the other relationship is provided. The windings are connected across a pair of supply conductors, a first circuit connecting the run winding means across the conductors and a second circuit connecting the start winding means across them. The second circuit is opened by speed responsive means of the conventional type when the relative rotation reaches a predetermined speed so that the motor then runs on the run winding means alone. We also provide selective switch means which may, in a dishwasher, be a timer control switch having two positions; one of the positions of the selective switch connects the start winding means in the first relationship, and the other position of the selective switch connects the start winding means in the second relationship. The speed responsive switch means is located in the second circuit so that it is between one of the supply conductors, on the one hand, and the start winding means, the control member, and the selective switch on the other hand.

In addition, in one of its positions, the selective switch connects the start winding means and the control member in a closed circuit which is independent of the speed responsive switch means. In this way, energization of the control member is effected by the voltage induced in the start winding means during running of the motor, it being understood that, in an induction-type motor, voltage is induced in the start winding as a result of relative rotation of the primary and secondary members. In the other position of the selective switch, it opens this closed circuit and thereby prevents energization of the control means when the speed responsive switch means is open.

The subject matter which we regard as our invention is particularly pointed out and distinctly claimed in the concluding portion of this specification. Our invention, however, both as to organization and method of operation, together with further objects and advantages thereof, may best be understood by reference to the following description taken in conjunction with the accompanying drawings.

In the drawings, FIGURE 1 is a front elevational view, with some of the parts broken away, of a dishwasher which may advantageously incorporate my invention;

Figure 1:
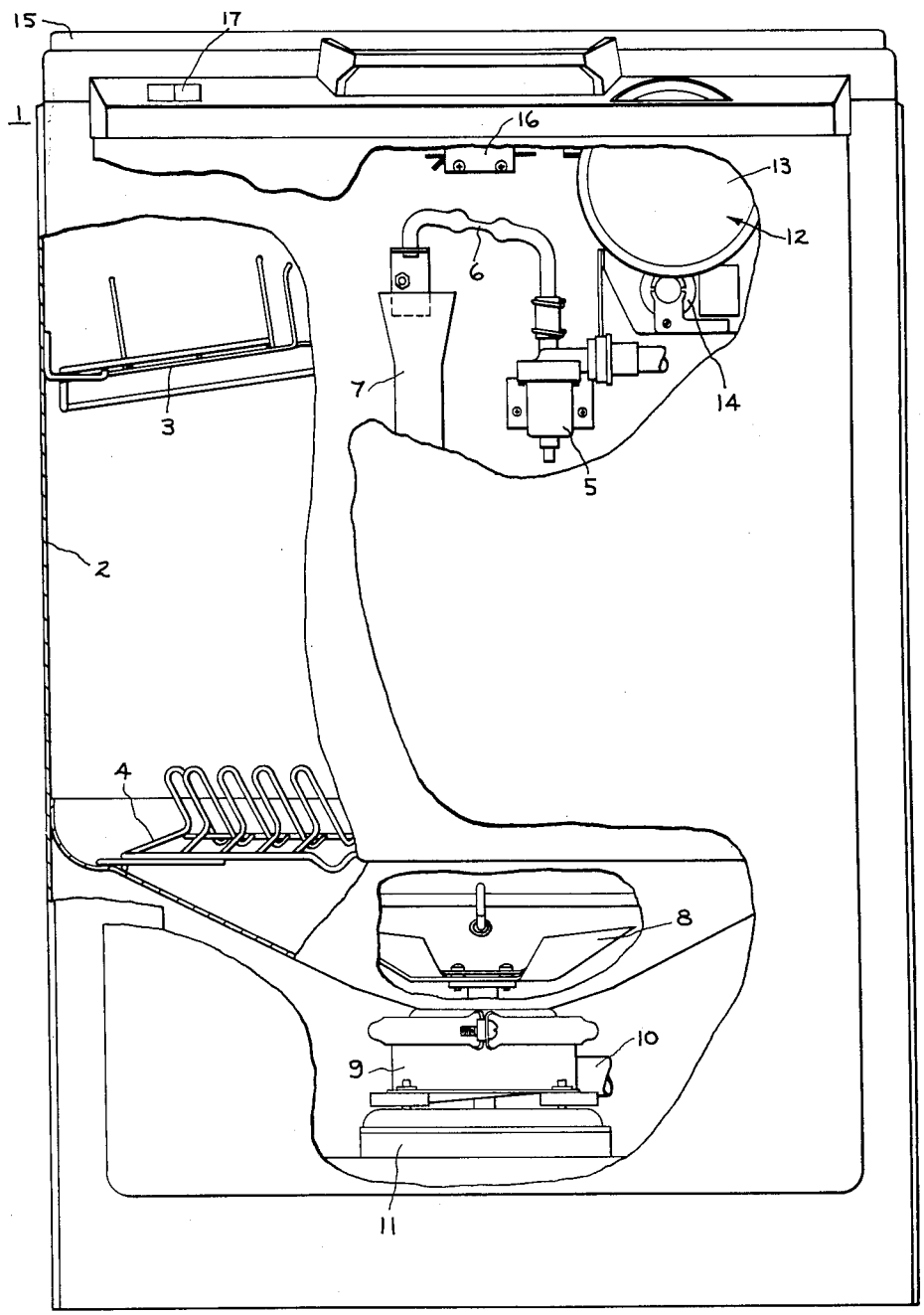

Referring now to FIGURE 1, there is shown a dishwasher 1 having an enclosed washing compartment or tub 2 of generally rectangular configuration in which are mounted an upper rack 3 and a lower rack arranged to support dishes or the like during washing operations. Dishwasher 1 is provided with a water inlet valve 5 adapted to be connected to a water supply system, a water inlet conduit 6, and a fill funnel 7 communicating with the interior of the tub 2. Located at the bottom of tub 2 and arranged to circulate washing fluid through the washing compartment is a rotary impeller 8. A drain pump 9 having an inlet communicating with tub 2 and an outlet connected to drain conduit 10 is supported beneath the tub, the housing of pump 9 being arranged to support an electric motor 11 which drives the impeller 8 so as to circulate the fluid in the tub when rotating in one direction, and to operate pump 9 so as to discharge fluid through conduit 10 when driven in the other direction. This washing impeller and drain pump arrangement is the invention of Russell M. Sasnett and Lauren W. Guth and is more fully described in copending application Serial No. 671,070, filed July 10, 1957, and assigned to the assignee of the present application.

Automatic operation of dishwasher 1 to provide a complete dishwashing and drying cycle is effected by a sequence control assembly, generally indicated by the numeral 12, which is arranged, as will be further explained, to control the operation of valve 5 and the energization of motor 11. The sequence control assembly is also conventionally used to control the actuation at various times of other components of dishwashing machines such as rinse agent dispensers, detergent dispensers, heaters, etc., which do not form a part of the present invention and which are therefore not shown and not further mentioned in this application. In the conventional manner, the timer 12 may include a switch-actuating rotary cam assembly 13 driven by a constant speed motor 14, such devices being well known in the art.

The tub 2 has a top access opening which is closed by a hinged top cover 15 during washing operations, being held in closed position by a latch mechanism 16 of any suitable type such as, for instance, the mechanism disclosed and claimed in Patent 2,896,641 issued on July 28, 1959, to Melvin R. Kauffman and John A. Dicken, Jr., assigned to the assignee of the present application. At the front of the machine there may be provided in a conveniently accessible position suitable manually operated means 17 which is used to initiate dishwasher cycles in the conventional manner. Purely for purposes of illustration, it will be understood that the typical full operating cycle of the dishwasher 1 may include a suitable number of rinsing, washing and drying steps; for instance, the cycle may include a preliminary rinse in which the inlet valve 5 is opened and the impeller 8 is rotated by the motor 11 for a short period of time, on the order of two minutes for instance, to circulate water in the tub; then motor 11 is reversed so as to operate the drain pump 9 and discharge the first charge of washing fluid from the tub and the inlet valve 5 is shut. This may be followed by a second preliminary rinse on the same order as described immediately above, and a washing step also similar to the first preliminary rinse except that the introduction of water and the circulation thereof by impeller 8 continues for a longer period of time. There then follow one, or preferably several, rinse steps similar to the preliminary rinse described; finally, a drying step of predetermined length, in which suitable heating means is energized to cause evaporation of the moisture on the dishes, may take place.

Figure 2:
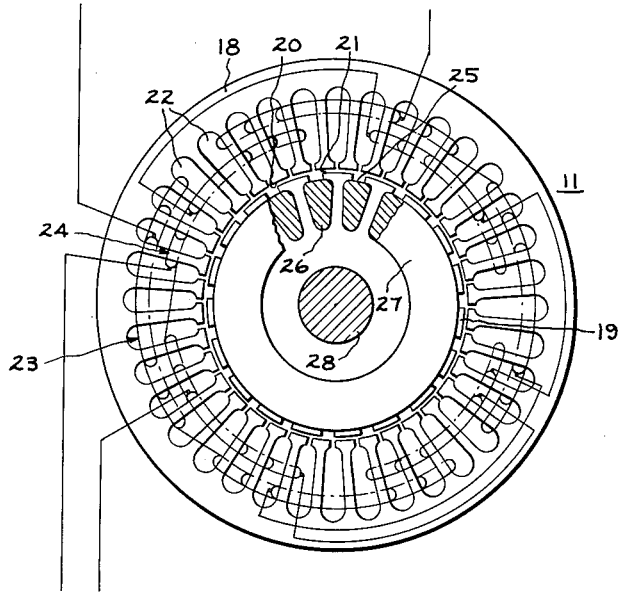
FIGURE 2 is a schematic illustration of a conventional induction-type motor.

Referring now to FIGURE 2 there is shown in schematic form the structure of motor 11. The motor has a primary member 18, generally called the stator, and a secondary member 19, generally called the rotor (although the rotational functions of the two may be reversed), both members being made up of cores formed of a stacked plurality of laminations of magnetic material. The rotor 19 rotates within the bore 20 of the stator so that the bore 20 and the surface of the rotor form between them an air gap 21. The stator is provided with a number of slots 22 opening into bore 20. A suitable run winding 23, which may be wound into any suitable number of poles such as four, as shown, is positioned in the slots 22; ninety electrical degrees removed from the winding 23, a suitable start winding 24, which is conventionally of the same number of poles as the run winding, is also positioned in the slots 22. It will be understood that in the conventional manner the start and run windings, in addition to being displaced in space, are displaced in electrical phase by any suitable means, either by differences in the resistances of the two windings or by external means such as a capacitor. In the type of machine 11 used in dishwashers, the resistance split-phase type of arrangement, wherein the internal resistances of the windings are used to obtain a phase difference, is generally satisfactory.

The secondary member, or rotor, 19 has openings 25 extending therethrough adjacent its outer surface. Within the openings, metal windings, frequently formed by casting aluminum, are provided and are joined together, or short circuited, at their ends by end rings 27. The rotor 19 is mounted on a shaft 28 which is secured to the device or devices to be driven by the motor; in this case, referring to FIGURE 1, these constitute the pump 9 and the impeller 8. As will be further explained, the start winding 24 is disconnected from the source of power during ordinary running operation of the motor by a speed sensitive device. However, as long as the rotor rotates at a relatively high rate of speed, it provides the phenomenon of a number of conductors cutting through a flux field and thereby induces a voltage in the start winding 24 even though it is disconnected from the source of power.

Figure 3:
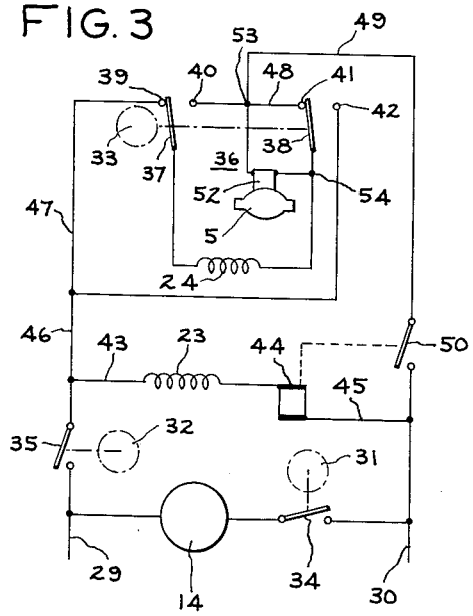
FIGURE 3 is a schematic electric wiring diagram illustrating a first embodiment of my control arrangement.

Referring now to FIGURE 3 in the light of the explanation given with respect to FIGURES 1 and 2, a first embodiment of our improved control arrangement will be described. The timer motor 14 of FIGURE 1 is energized across a pair of supply conductors 29 and 30. Motor 14 controls cams 31, 32 and 33; the cams in turn, as they rotate, control the closing of, respectively, switches 34, 35, and 36. It will be observed that switch 36 is a two-pole double-throw switch having a pair of ganged poles or switch arms 37 and 38. Switch arm 37 is engageable with either of contacts 39 and 40. When switch arm 37 engages contact 39, switch arm 38 engages a contact 41, and when the switch arm 37 engages contact 40, the switch arm 38 engages a contact 42.

The run winding 23 of the motor is connected in a first energizing circuit across the supply conductors 29 and 30, the circuit including a conductor 43, the run winding, a speed responsive device such as relay 44, and a conductor 45. In parallel with the energizing circuit for the run winding 23 in a second energizing circuit which provides for the energization of start winding 24. With the switch 36 in the position shown, an energizing circuit for the start winding is completed through conductors 46 and 47, contact 39, contact arm 37, the start winding 24, contact arm 38, contact 41, a conductor 48 (which joins contacts 40 and 41), conductor 49, and a switch 50 back to conductor 30. Switch 50 is controlled by relay 44 so that when no current or a limited amount of current (as is true when motor 11 is operating at running speed) is passing through the relay coil 44 the switch 50 is opened. However, when a relatively high current passes through the windings 23 and relay 44, as is true during starting of an electric induction-type motor, the relay coil 44 causes the contact 50 to close. With switch 36 in this position, as shown, the motor 11 starts to operate in the direction to effect operation of pump 9 to pass liquid out through drain 10. When the contact arms 37 and 38 have their position reversed by cam 33, that is, they are respectively in engagement with contacts 40 and 42, the following energizing circuit is completed for start winding 24: from conductor 46, the circuit passes through a conductor 51, contact 42, contact arm 38, the start winding 24, contact arm 37, contact 40, conductors 48 and 49, and switch 50. It will be observed that the start winding 24 is energized in reverse directions relative to the main winding for, respectively, the first and second positions of the contact arms 37 and 38. With switch 36 in this position, motor 11 starts to rotate in the direction effective to cause impeller 8 to circulate liquid in the tub 2.

The second circuit described, provided for energizing the start winding, also includes a solenoid 52 which is operatively associated with the valve 5 so that when the solenoid is energized the valve is opened and when the solenoid is not energized the valve is closed. Solenoid 52 is a high impedance device compared to the motor windings 23 and 24; for instance, the solenoid impedance is generally on the order of 3,000 to 5,000 ohms, whereas the motor impedance may be on the order of two to five ohms. One side of the solenoid is connected to point 53 in conductor 48 and the other side of the solenoid is connected to point 54 which lies between the contact arm 38 and the start winding 24. When the contact arms 37 and 38 are in the position shown and the switch 50 is open, the solenoid 52 cannot be energized since no energizing circuit is provided therefor. However, when the contact arms are in their second position, that is, contact arms 37 and 38 engage respectively contacts 40 and 42, the solenoid 52 and start winding 24 are included in a closed loop circuit substantially as follows: from the contact arm 37 the circuit passes through contact 40, conductor 48, the point 53, solenoid 52, the point 54, through the start winding, and back to contact arm 37. With this arrangement, the start winding 24 and the solenoid 52 are in a closed circuit; as stated earlier in connection with FIGURE 2, during running of the motor the rotation of rotor 19 causes an induced voltage to be provided in the start winding 24. When the start winding is connected in a closed circuit with the solenoid 52, this induced voltage is provided across the solenoid 52 to cause passage of current therethrough. In one conventional type of commercially produced motor a start winding will, when the motor is operated under ordinary load across a 110 volt source of A.C. supply, provide an induced voltage of about 50 volts across solenoid 52; it will be recognized that a solenoid may readily be designated to be operated at this voltage.

With the contact 50 positioned as it is between the conductor 30 and the entire remainder of the second circuit described, it will be observed that during running of the motor no line voltage can pass through the components of the second circuit. Thus, since the solenoid 52 is one such component, its energization during motor rotation is entirely dependent on the positioning of contact arms 37 and 38, and on the energization of the run winding of the motor as controlled by motor switch 35.

In operation, the cycle of the dishwasher of FIGURE 1 may be commenced by operation of one of the controls 17 to cause a closing of the contact 34; this energizes the timer motor which then proceeds to rotate the cams 31, 32 and 33, as well as the other cams which will ordinarily be provided to control the components mentioned above as usually provided but not illustrated. In order to effect the type of washing cycle briefly described previously, the cam 33 changes the position of the switch arms 37 and 38 so that they engage contacts 40 and 42 respectively. Thereafter, the switch 34 closes and the motor starts in the direction effective to cause impeller 8 to provide a liquid circulating action. When the motor comes up to speed, which occurs in a mere second or less, the relay 44 opens contact 50 to deenergize the start winding and then, by virtue of the induced voltage in the start winding, the solenoid 52 is energized to provide for water to be introduced through valve 5. In this manner, a preliminary rinse is provided with the valve 5 open and the motor 11 running in the direction to effect operation of the impeller 8. At the end of the first preliminary rinse, the switch arms 37 and 38 are moved by cam 33 over to the position shown and cam 32 opens switch 35 to de-energize the motor; this also de-energizes the solenoid 52, both because there is no longer any rotation of rotor 19 to induce a voltage in winding 24 and because the movement of arms 37 and 38 opens the induction circuit for the solenoid. It will be observed that should energization of solenoids 52 be desired for less than the full rinse period, arms 37 and 38 may be moved over to the position shown when the valve 5 is to be closed during the rinse. Since contact 50 is open, this action has no effect on the motor, but it does open the solenoid energizing circuit; in addition, it prepares the motor for the pumping operation which is to follow.

After switch 35 has been open long enough for the motor to stop, or, at least, to slow down substantially, it is re-closed to effect starting of the motor in the opposite direction to cause pump 9 to remove the liquid from the dishwasher. As stated, in this position of switch 36 there is no closed circuit including the winding 24 and the solenoid 52, and therefore the solenoid remains de-energized.

Subsequent rinses and washes and the pumping out operations which follow each one of them are conducted in the same manner, the timer motor 14 continuing to rotate cams 31, 32 and 33; after an appropriate number of rinses and washings, cams 31 and 32 open switches 34 and 35 to de-energize the motor 11 and the timer 14 so that all components of the dishwasher are de-energized at the end of the cycle.

It will be seen that in this manner the induced voltage of the winding 24 is used to control the energization of solenoid 52 so that the solenoid 52 introduces water at the appropriate time without the need for an additional timer-controlled switch, it being recognized that a two-pole double-throw switch such as 36 is conventionally required to effect reversal of a motor having a single main winding and a single start winding. It will further be observed that should something occur to cause misoperation of the motor so that the rotor ceases to rotate the solenoid will also be de-energized since there will no longer be any voltage induced in winding 24, and thus the circuit is inherently a safe one with introduction of water not being possible if the motor fails to run. A further point is with respect to an overload on the motor; as is well known, an overload causes a substantial decrease in the amount of voltage induced in the start winding. Thus, in case of a motor overload for whatever reason, the start winding will not have enough voltage induced in it to operate the solenoid 52, thus providing another safety factor.

Figure 4:
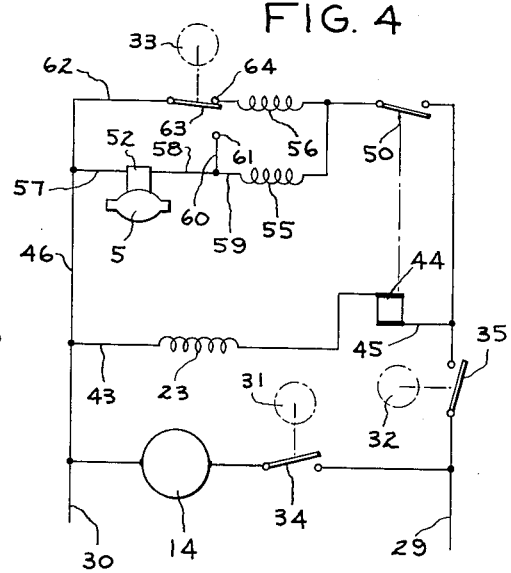
FIGURE 4 is a schematic electric wiring diagram illustrating a second embodiment of my control arrangement.

Referring now to FIGURE 4, a second embodiment of my invention is shown in which parts which are the same as those described in connection with the first three figures will be referred to by like numerals. It will be seen that the circuits for the timer motor 14 and for the main winding 23 are precisely the same as in the embodiment of FIGURE 3. However, two separate start windings 55 and 56 are provided for the two opposite directions of rotation of the motor 11, with winding 55 being wound to provide starting in a first direction of rotation of the motor 11 and the other winding 56 being wound to provide starting in the opposite direction of rotation. It will be understood that this provision of two separate windings for the two different directions of rotation is conventional, and that the windings are provided in a conventional type of motor of the general type previously described. Energization of the winding 56 provides rotation of the motor in the direction to effect washing and rinsing operations, while rotation of the motor as caused by winding 55 provides for the pumping operation.

The first portion of the circuit extending from conductor 46 includes a conductor 57, the solenoid 52, conductors 58 and 59, the start winding 55, and relay contact 50 to the other side of the line. It will be observed that this arrangement places solenoid 52 and the start winding 55 in series with each other. Since the solenoid is a high-impedance device while the start winding is a relatively low-impedance device, this causes a major part of the voltage drop across the circuit to occur across the solenoid rather than across the winding. Between conductors 58 and 59 a conductor 60 extends to a contact 61.

A second portion of the start winding circuit includes, starting at conductor 46 again, a conductor 62, a switch arm 63 controlled by the motor reversing cam 33, a contact 64, the start winding 56 and the relay contact 50, thus leading back to the other side of the line and supply conductor 29. When switch arm 63 is in the position shown, the windings 55 and 56 are connected in parallel when contact 50 is closed, that is, one of the parallel circuits extends through the winding 55 and the solenoid 52 while the other parallel circuit extends through the winding 56 and the contact 63. Because of the relatively high impedance 52 in series with winding 55, winding 56 is the one effective to start the motor, and as previously mentioned the motor is started in the direction appropriate for effecting washing operation.

When the contact arm 63 is moved into engagement with contact 61 by cam 33, there is no circuit completed through winding 56, and instead a circuit from contact 50 is completed through winding 55, conductors 59 and 60, contact 61, contact arm 63 and conductor 62 back to conductor 46. Thus, the second position of the switch arm causes energization of the winding 55 and the motor starts in the opposite direction to effect a pumping out operation.

With the switch arm 63 in the position shown, a closed circuit including both windings 55 and 56 and the solenoid 52 is provided as follows: starting at the solenoid 52, through conductors 58 and 59, windings 55 and 56, contact 64, contact arm 63, and conductors 62 and 57 back to the solenoid 52. In this manner there is once again provided an energizing circuit for the solenoid 52 when the motor is rotating by virtue of the voltage induced in the start windings 55 and 56. In addition, because two such start windings are provided, the voltage induced across them under normal operating conditions in ordinary commercially-used motors has been found to be on the order of 100 to 110 volts. This, then, permits the use of a solenoid 52 which is of the completely conventional type appropriate for use in 110 volts supply systems.

When the contact arm 63 engages contact 61, there is no longer a closed circuit including either of the start windings 55 and 56 with the solenoid 52 and therefore, when the relay contact 50 is opened as it is except during starting, there is no energization of the solenoid 52. The operation of the motor is substantially the same as before insofar as the sequence of switching is concerned, the engagement of contact arm 63 with contact 64 providing for motor rotation effective to operate impeller 8 and for solenoid energization, and engagement of contact arm 63 with contact arm 61 providing for a pumping out operation without energization of solenoid 52.

While in accordance with the patent statutes we have described what at present are considered to be the preferred embodiments of our invention, it will be obvious to those skilled in the art that various changes and modifications may be made therein without departing from the invention, and we therefore aim in the appended claims to cover all such changes and modifications as fall within the true spirit and scope of the invention.

What we claim as new and desire to secure by Letters Patent of the United States is:

1. In combination: an induction-type motor having relatively rotatable primary and secondary members, said primary member including a magnetic core, low-impedance run winding means on said core, and low-impedance start winding means on said core, said start winding means being energizable in two different relationships to said run winding means, said run winding means and said start winding means providing one direction of relative rotation when said start winding means is in said first relationship to said run winding means, said run winding means and said start winding means providing the opposite direction of relative rotation when said start winding means is in said second relationship to said run winding means, a pair of supply conductors, a first circuit connecting said run winding means across said conductors, a second circuit connecting said start winding means across said conductors, speed responsive switch means opening said second circuit when said relative rotation reaches a predetermined speed, and selective switch means in said second circuit having two positions, said selective switch means in one position connecting said start winding means in said first relationship and in its other position connecting said start winding means in said second relationship; and a high-impedance electric control member in said second circuit; said speed responsive switch means being located in said second circuit between one of said supply conductors on the one hand and said start winding means, said control member, and said selective switch means on the other hand, a loop circuit formed in said second circuit and including said start winding means, said control means, and said selective switch means, said selective switch means in one position thereof closing said loop circuit independently of said speed responsive switch means thereby to effect energization of said control member by the voltage induced in said start winding means during running of said motor, said selective switch means in the other position thereof opening said loop circuit thereby to prevent energization of said control means when said speed responsive switch means is open.

2. The apparatus defined in claim 1 wherein said control means is a solenoid.

3. In combination: an induction-type motor having relatively rotatable primary and secondary members, said primary member including a magnetic core, a low-impedance running winding on said core, and first and second low-impedance start windings in parallel with each other on said core, said running winding and said first start winding when energized causing relative rotation of said primary and secondary members in a first direction, said running winding and said second start winding when energized causing relative rotation of said primary and secondary members in the opposite direction, a pair of supply conductors, a first circuit connecting said running winding across said conductors, a second circuit connecting a selected one of said starting windings across said supply conductors, speed responsive switch means in said second circuit opening said second circuit when said relative rotation reaches a predetermined speed, and selective switch means in said second circuit having two positions, said selective switch means in one position connecting said first start winding in said second circuit directly across said conductors and in its other position connecting said second start winding in said second circuit directly across said conductors; and a high-impedance electrical control member connected in said second circuit in series with said first start winding and in parallel with said second start winding; said speed responsive switch means being located in said second circuit between one of said supply conductors on the one hand and said start windings, said control member, and said selective switch means on the other hand, said selective switch means in said second position thereof connecting said start windings and said control member in a closed circuit independently of said speed responsive switch means thereby to effect energization of said control member by the voltage induced in said start windings during running of said motor, said selective switch means in said first position thereof opening said closed circuit thereby to prevent energization of said control means when said speed responsive switch means is open.

4. In combination: an induction-type motor having relatively rotatable primary and secondary members, said primary member including a magnetic core, a low-impedance run winding on said core, and a low-impedance start winding on said core, a pair of supply conductors, a first circuit connecting said run winding across said conductors, a second circuit connecting said start winding across said conductors, speed responsive switch means opening said second circuit when said relative rotation reaches a predetermined speed, and a selective double-throw switch in said second circuit having first and second ganged poles each having first and second contacts, said first contact of one said pole being connected to said second contact of the other said pole, said selective switch in one position connecting said start winding means in a first relationship to said run winding and in its other position connecting said start winding in the reverse relationship to said run winding, said run winding and said start winding providing one direction of relative rotation when said start winding is in said first relationship to said run winding, said run winding and said start winding providing the opposite direction of relative rotation when said start winding is in said reverse relationship to said run winding; and a high-impedance electric control member having one end thereof connected to said first contact of said one pole and said second contact of said other pole of said selective switch and having its other end connected between one of said poles in said switch and said start winding; said speed responsive switch means being located in said second circuit between one of said supply conductors on the one hand and said start winding, said control member, and said selective switch on the other hand, whereby said selective switch in one position thereof connects said start winding and said control member in a closed circuit independently of said speed responsive switch means thereby to effect energization of said control member by the voltage induced in said start winding during running of said motor, and in the other position thereof opens said closed circuit thereby to prevent energization of said control means when said speed responsive switch means is open.

5. A dishwasher including sequence control means; a receptacle for dishes and liquid; water inlet valve means arranged to introduce water to said receptacle; an impeller for circulating liquid in said receptacle; a pump for draining liquid from said receptacle; an electric motor operatively connected to said pump and to said impeller, said motor in one direction of rotation thereof operating said impeller to circulate liquid introduced into said receptacle, said motor in the other direction of rotation thereof operating said pump to remove water from said receptacle, said motor being of the induction type having relatively rotatable primary and secondary members, said primary member including a magnetic core, low-impedance run winding means on said core, and low-impedance start winding means on said core, said start winding means being energizable in two different relationships to said run winding means, said run winding means and said start winding means providing said one direction of rotation when said start winding means is in said first relationship to said run winding means, said run winding means and said start winding means providing said other direction of rotation when said start winding means is in the said second relationship to said run winding means, a pair of supply conductors, a first circuit connecting said run winding means across said conductors, a second circuit connecting said start winding means across said conductors, speed responsive switch means opening said second circuit when said rotation reaches a predetermined speed, and selective switch means in said second circuit having two positions and operated by said sequence control means, said selective switch means in one position connecting said start winding means in said first relationship and in its other position connecting said start winding means in said second relationship; and a high-impedance electric control member in said second circuit controlling operation of said inlet valve, said control member opening said inlet valve when energized and closing said inlet valve when de-energized; said speed responsive means being located in said second circuit between one of said supply conductors on the one hand and said start winding means, said control member, and said selective switch means on the other hand, a loop circuit formed in said second circuit and including said start winding means, said control means, and said selective switch means, said selective switch means in a first position thereof closing said loop circuit independently of said responsive switch means thereby to effect energization of said control member by the voltage induced in said start winding means during running of said motor, said selective switch means in the other position thereof opening said loop circuit thereby to prevent energization of said control means when said speed responsive switch means is open.

References Cited in the file of this patent

UNITED STATES PATENTS

| | | |
|---|---|---|
| 2,280,888 | Buchanen | Apr. 28, 1942 |
| 2,759,136 | Jaeschke | Aug. 14, 1956 |